United States Patent [19]

Mraz et al.

[11] Patent Number: 5,593,164
[45] Date of Patent: Jan. 14, 1997

[54] FERROFLUIDIC SEAL CENTERING RING

[75] Inventors: William B. Mraz, Epping; Thomas J. Black, Jr., Merrimack, both of N.H.; Paul E. McMahan, Walker, La.; Larry A. Hufford, Valley Center; David T. Mooney, San Rafael, both of Calif.; Robert C. Watkins, Moss Point, Miss.

[73] Assignee: Ferrofluidics Corporation, Nashua, N.H.

[21] Appl. No.: 561,563

[22] Filed: Nov. 22, 1995

Related U.S. Application Data

[63] Continuation of Ser. No. 424,578, Apr. 17, 1995, abandoned, which is a continuation of Ser. No. 960,818, Oct. 8, 1992, abandoned.

[51] Int. Cl.⁶ ............................... F16J 9/00; B23B 49/00
[52] U.S. Cl. .............. 277/9.5; 277/11; 277/80; 29/464; 33/642; 33/644
[58] Field of Search ................... 277/9, 9.5, 10, 277/11, 80; 33/533, 642, 644, 645; 29/888.3, 464, 407.09

[56] References Cited

U.S. PATENT DOCUMENTS

| | | |
|---|---|---|
| 3,572,855 | 3/1971 | Weichsel . |
| 3,740,060 | 6/1973 | Miskolczy et al. . |
| 3,814,443 | 6/1974 | Steigerwald . |
| 4,054,293 | 10/1977 | Hoeg et al. . |
| 4,171,818 | 10/1979 | Moskowitz et al. . |
| 4,252,328 | 2/1981 | Raj et al. . |
| 4,252,353 | 2/1981 | Raj et al. . |
| 4,295,276 | 10/1981 | Ellington, III . |
| 4,380,356 | 4/1983 | Weghaupt . |
| 4,424,974 | 1/1984 | Mitsuya et al. . |
| 4,436,313 | 3/1984 | Tamama et al. . |
| 4,506,895 | 3/1985 | Raj . |
| 4,527,802 | 7/1985 | Wilcock et al. . |
| 4,667,967 | 5/1987 | Deuring .................. 277/153 |
| 4,694,213 | 9/1987 | Gowda et al. . |
| 4,815,747 | 3/1989 | Walford ................... 277/82 |
| 4,933,927 | 6/1990 | Ross ........................ 33/644 |
| 5,035,062 | 7/1991 | Leonov et al. ........... 33/645 |
| 5,052,695 | 10/1991 | Curtis ...................... 277/153 |
| 5,110,141 | 5/1992 | Dayan ...................... 277/80 |
| 5,209,496 | 5/1993 | Azibert .................... 277/9 |

FOREIGN PATENT DOCUMENTS

| | | |
|---|---|---|
| 267656 | 11/1963 | Australia . |
| 0336016 | 12/1988 | European Pat. Off. . |
| 55-51124 | 4/1980 | Japan . |
| 0189368 | 8/1986 | Japan ....................... 277/80 |
| 1537941 | 1/1990 | U.S.S.R. .................. 277/80 |
| 783881 | 10/1957 | United Kingdom . |
| 773351 | 10/1980 | United Kingdom . |
| 775332 | 10/1980 | United Kingdom . |
| 8303453 | 10/1983 | WIPO . |

OTHER PUBLICATIONS

World Pumps, No. 324, Sep. 1993, Will Mraz, Applying Magnetic Fluid Sealing Technology To Process Pumps, pp. 14–18.

*Primary Examiner*—Daniel G. DePumpo
*Attorney, Agent, or Firm*—Bookstein & Kudrika, P.C.

[57] ABSTRACT

A ferrofluidic seal is fitted with a centering ring having an inner edge adapted for engagement with a rotating shaft for centering the seal about the rotating shaft. The centering ring automatically engages the shaft and centers the seal when the seal is fitted onto the shaft. The centering ring is affixed to the housing, and/or magnet and pole module. In one embodiment, the centering ring may be removed after it performs its centering function. In another embodiment, the centering ring is non-removable and remains within the seal permanently. According to this latter embodiment, the centering ring serves the additional purpose of retaining ferrofluid, expelled from the seal during "bursting", within magnetic reach of the seal so as to be re-drawn into the seal, thus extending seal life. Additionally, a ferrofluid retaining ring absent a centering function may be employed. The centering ring provides for easy installation and accurate centering of a seal with which it is used, and yields a highly functional and operationally safe seal.

24 Claims, 10 Drawing Sheets

FERROFLUIDIC SEAL CENTERING RING

This is a continuation, of application Ser. No. 08/424,578, filed Apr. 17, 1995 now abandoned, which is a continuation of application Ser. No. 07/960,818, filed Oct. 8, 1992 now abandoned.

FIELD OF THE INVENTION

The present invention relates to ferrofluidic seals, and more specifically to a mechanism for centering such seals about a shaft when the seals are mounted in position on a utilization device.

BACKGROUND OF THE INVENTION

Ferrofluidic seals are commonly utilized to provide a hermetic seal against gas and other contaminants in applications where a rotary shaft must be sealed. Ferrofluidic seals have been utilized in computer magnetic disc storage units as a barrier between the motor area and the disc area for preventing contaminants from reaching the disc area, for robotic actuators designed for use in ultra-pure vacuum processing of semi-conductor wafers, for sealing rotary anodes in high vacuum environments, and for pumps in refineries and chemical plants.

Ferrofluidic seals can be utilized to seal any component which is in stationary or rotational relation with another component. Such seals are normally installed to remain stationary about rotating shafts, but can be installed to seal a stationary shaft about which a hub rotates. The seals operate generally through the employment of ferrofluid in a gap between a rotating shaft and stationary seal surfaces, and include an annular magnet for providing a desired magnetic flux path which retains and concentrates the ferrofluid in a seal-tight liquid O-ring in the gap. Ferrofluidic seals typically include a permanent annular ring magnet polarized axially, and a pair of magnetically-permeable annular pole pieces which sandwich the magnet, so that inner peripheral edges of the pole pieces extend toward and form a close, non-contacting gap with the exterior shaft surface.

Ferrofluidic seals have been constructed and arranged to address a variety of sealing needs. A single-stage ferrofluidic seal can be created by placing a single annular pole piece in close proximity with and surrounding a magnetically-permeable shaft and in magnetic communication with a single magnet. Ferrofluid is retained in the pole-piece/shaft gap by the magnetic field created by the magnet, which field follows a magnetic circuit containing the magnet, pole-piece, the gap, and the shaft. A second annular pole piece also in close proximity with the shaft and in magnetic communication with the other pole of the magnet can advantageously be employed in a single-stage seal. The gap between this second pole-piece and the shaft generally contains no ferrofluid but enhances the magnetic flux across the gap within which ferrofluid is retained in the single-stage seal, thereby increasing the pressure capacity of the seal.

Alternatively, the gap between the second pole-piece and the shaft may contain ferrofluid, creating a two-stage seal. U.S. Pat. No. 5,018,751, issued May 28, 1991, and U.S. Pat. No. 4,506,895, issued Mar. 26, 1985, and assigned to the same assignee of the present invention, describe the above-noted two-stage ferrofluid seals.

In addition, a ferrofluid seal may comprise any number of stages, that is, the seal may comprise a plurality of discrete pole-pieces, or a pole-piece (or pole-pieces) may include a plurality of ridges and grooves, each ridge in close proximity with the shaft and defining an annular gap between the pole-piece and the shaft. Ferrofluid is retained in several or all of these gaps to form a multi-stage ferrofluidic seal.

A number of embodiments comprising a variety of arrangements and designs exist with respect to ferrofluidic seal pole-pieces and with respect to the relationship between pole-piece(s), shaft-support bearings, and other components of a ferrofluidic sealing system. For example, ridges and grooves may be formed in a shaft, rather than in a pole-piece or pole-pieces, to define a single-stage or multi-stage ferrofluidic seal. A pole-piece (or one or more of several ridges in a pole-piece) may be tapered, or may be of a particular width or have a concentric radius different from that of other ridges or pole-pieces. Geometric variances such as these allow tailoring of particular properties of an overall ferrofluid seal arrangement such as the longevity of a particular gap with respect to ferrofluid retention, advantageous heat dissipation, the prevention of ferrofluid splashing at high shaft or hub rotation speeds, the selective retention of ferrofluid in one or more annular gaps, and other properties.

It is important, for proper-operation of a ferrofluidic seal, to accurately mount the pole piece or pole pieces concentrically with the shaft. Inaccurate centering of the pole piece(s) about the shaft will result in non-uniform width of the resultant annular gap between the pole piece(s) and the shaft. Generally, it is the pole piece or pole pieces which are in closest proximity with a shaft and for which centering is most critical. However, other components which create a ferrofluid seal may be in close proximity with the shaft as well. For example, an annular magnet may be sandwiched by pole-pieces, the magnet and pole pieces all having identical inner radii. It is to be understood that it is critical to center any component of a ferrofluid seal arrangement which is in close (especially that component which is in closest) proximity with the shaft. Herein below, "seal" will refer to components of a ferrofluid seal which are in close proximity with the shaft and with respect to which centering is critical.

If a seal is not mounted concentrically with a shaft, the magnetic field will not follow a symmetric path about the shaft, but magnetic flux will be enhanced at the narrowest portion of the gap and diminished at the widest portion. This uneven distribution may also prevent the fluid from flowing evenly during operation and may either cause such fluid to heat up and evaporate, or splash out of the gap area. Thus, when the shaft is stationary or rotating slowly relative to the housing, ferrofluid may not be evenly distributed within the annular gap, but may be drawn to the narrowest portion of the gap leaving the widest portion with insufficient fluid to maintain adequate sealing strength. Such sealing strength inadequacy can lead to seal "bursting" at a lower threshold differential across the seal than would normally occur. U.S. Pat. No. 4,407,518, issued Oct. 4, 1983 and assigned to the same assignee of the present invention graphically illustrates ferrofluid seal bursting.

The nature of ferrofluidic seals is that they will "self-heal" to some extent after such bursting. That is, ferrofluid ejected from the seal during bursting which is not displaced beyond a particular distance from the seal within the reach of the magnetic field of the seal may be drawn back into the active seal area. However, net loss of ferrofluid from the seal generally does occur with each burst, thus repeated occurrences of seal overpressurization can result in reduction in seal pressure capacity.

In addition, dynamic eccentricity is inherent in any rotating shaft, thus the contribution from shaft eccentricity due to inaccurately centered ferrofluidic seals must be minimized. A very high speed rotary shaft or a shaft which is relatively unevenly supported by bearings (for example to allow long shaft overhang) may exhibit excessive dynamic eccentricity. Also, a shaft supported by aged bearings may exhibit an unacceptable degree of dynamic eccentricity. Such dynamic eccentricity may create, among others, two notable problems. First, the shaft may come into contact with a portion of the seal and deflect the seal or cause a magnetic short circuit, thereby negatively affecting its operation. The shaft may also be damaged by such contact with the seal. Second, when the shaft is most eccentrically displaced during rotation, the resultant uneven annular gap forms a ferrofluid seal which is weakened at the widest portion of the gap. Thus, bursting as described above may occur at the weakened portion of the seal. Therefore, it is critical to the operation of ferrofluidic seals, and desirable for avoiding shaft damage, for seals to be accurately centered about shafts.

Customarily, accurate centering of a seal about a shaft is effected by accurately piloting (registering) the shaft-support bearings and the seal in a common housing. The accuracy of this method relies upon the accuracy of shaft centering in the housing and the accuracy of the surface against which the seal pilots. Construction of a shaft/seal arrangement in such a way is advantageously carried out at one location to assure overall accuracy.

In some cases, however, the seal cannot be contained within or piloted against a housing in which the shaft is accurately mounted, the seal may not be mountable close to a bearing in precise relationship with the shaft, the housing upon which the seal is to be mounted may not be fitted with a recess for accommodating the seal, it may be inconvenient or impossible to verify the concentricity of an existing recess with the shaft, or the end of the shaft may not be accessible for sliding the seal over the shaft. It is not uncommon to encounter one of these situations when mounting a ferrofluid seal onto an existing apparatus which requires additional sealing capacity, when repairing or replacing components in an apparatus utilizing ferrofluidic seals, when replacing ferrofluidic seals, or when performing other activities in the "field", that is, away from precision machining and assembly equipment. A notable example follows. It is increasingly important, in oil refinery pumps, to contain any volatile fumes which may escape as a result of the leakage of volatile liquids. The operation of a refinery pump typically involves a shaft driven by a motor and supported by precision bearings in a first housing, the shaft passing through a space which serves as a service access and through a mechanical face seal into a second housing, or pump area, in which an impeller is driven by the shaft to propel a liquid such as gasoline. The mechanical face seal is not a bearing and does not support the shaft with any degree of positional precision. The mechanical face seal relies on minute leakage across the seal faces for lubrication. State of the art low emission seals actually operate with vapor at the faces rather than a liquid. Thus, a volatile vapor is slowly but continuously released into the access area and then into the atmosphere. It is advantageous to seal a portion of the access area which immediately surrounds the mechanical face seal to contain fumes from the volatile vapor, and ferrofluidic seals are ideal for this purpose. However, there is no convenient means of accurately mounting a ferrofluidic seal on a mechanical face seal enclosure, and mechanical face seals require relatively frequent service, thus the removal and replacement of ferrofluidic seals is especially important in this application. Indeed, it is desirable to mount ferrofluid seals of this type in existing refinery pumping stations and in many other existing sources of noxious fumes such as chemical plants, thus techniques applicable for "field" work are especially desirable.

One past approach for centering a seal about a shaft in applications such as those described above involves sliding the seal over and down the shaft to the housing, thereafter sliding a tapered tubular sleeve over and down the shaft, tapered end first, and forcing the sleeve between the seal and the shaft. The sleeve, being tapered, is wedged concentrically between the seal and shaft, thereby centering the seal about the shaft. The seal may then be permanently fastened to the stator of the equipment. Finally, the tubular sleeve is removed.

Another past approach involves wrapping thin metal shim stock around the shaft before sliding the seal over the shaft. The shim stock lies concentrically and evenly about the shaft for centering the seal which is slid over the shim stock. After affixing the seal to the existing equipment, the shim stock is removed.

These past approaches for centering ferrofluidic seals have associated drawbacks and problems. In particular, the approaches involving the tubular sleeve and the shim stock are burdensome and time consuming. In addition, it is important that the tubular sleeve or shim stock be placed precisely in position between the seal and the shaft in order to create an accurate concentric air gap, before fastening the seal to a stationary stator. The precise positioning of the tubular sleeve and shim stock is not easily achievable. As such, a difficult and tedious procedure is required centering the seal. Additionally these centering methods are not compatible with pre-assembled cartridge seal designs.

Additionally, no method currently exists for retaining ferrofluid, expelled from a ferrofluidic seal by seal bursting due to overpressurization, within close proximity of the seal such that the expelled ferrofluid will be drawn back into the active seal area by the magnetic field.

Accordingly, a general purpose of the present invention is to provide a self-activating mechanism for centering a ferrofluidic seal about a shaft, which mechanism is convenient and rapidly employed, to provide a mechanism for centering a ferrofluidic seal, which seal is retrofitted about a shaft having neither end accessible, to provide a mechanism for centering a ferrofluidic seal, which mechanism may be left permanently in place within the seal after the seal is installed, to provide a mechanism for centering a ferrofluidic seal, which mechanism may be easily removed after the seal is installed, and to provide a means and mechanism for retaining ferrofluid, expelled from the seal via bursting due to overpressurization, in close proximity to the seal such that a substantially large portion of the expelled ferrofluid is retained within reach of the magnetic field of the seal so as to be drawn back into the active seal region such that minimal net loss of ferrofluid occurs during bursting, thus minimizing the reduction in pressure capacity of the seal due to such bursting.

SUMMARY OF THE INVENTION

The aforementioned problems and drawbacks are overcome by providing a centering ring which can be attached to a seal in a fixed relationship with a magnet and pole piece module. The centering ring engages the shaft when the seal is installed to center the seal about the shaft. The centering ring includes an inner edge which extends past the pole pieces and directly contacts the shaft. The centering ring may be designed to be removable from the seal after the seal is installed around the shaft, or the centering ring may remain in place during operation of the seal, the inner edge of the centering ring constructed so as to slowly abrade away due to contact with the rotating shaft or to break off in a harmless manner. The centering ring which is constructed to remain in place during operation may serve the further function of retaining ferrofluid, expelled from the seal during "bursting", in close proximity to the seal so as to be drawn back into the seal by the magnetic circuit, the longevity of the seal being thereby extended.

Other advantages, novel features and objects of the invention will become apparent from the following detailed description of the invention when considered in conjunction with the accompanying drawings.

DETAILED DESCRIPTION

Figure 1:
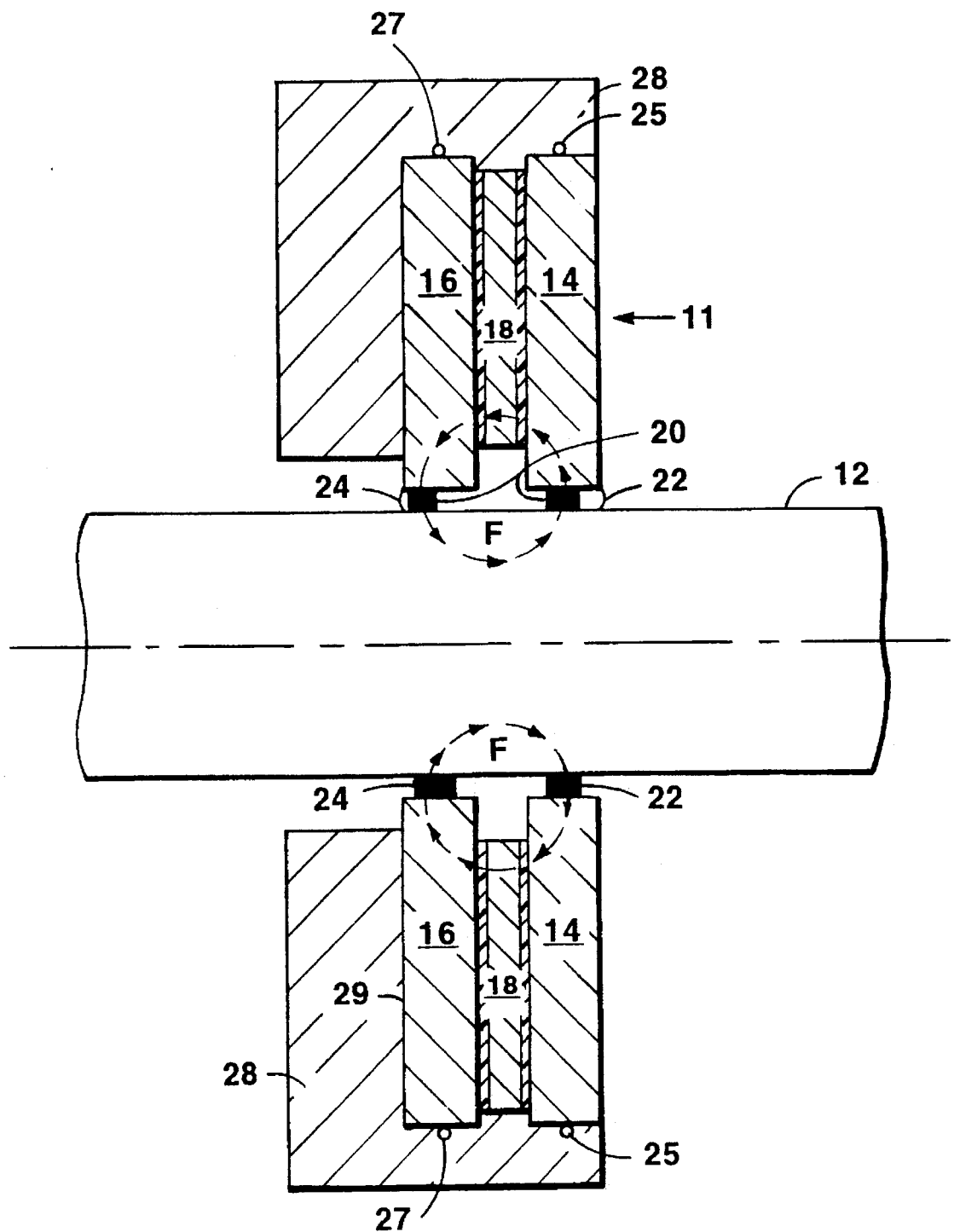
FIG. 1 is a cross-sectional view of a prior art ferrofluidic seal in operation about a rotating shaft.

Referring to FIG. 1, a prior art two-stage ferrofluidic seal structure is shown including a seal module 11 consisting of an annular magnet 18 and axially affixed annular pole pieces 14 and 16. The seal is located in recess 120 within a housing 28 which axially surrounds a magnetically-permeable shaft 12. It is to be understood in this and further embodiments that shaft 12 may be solid or hollow, and may be in stationary or movable relation with housing 28. Thus, shaft 12 may rotate within stationary housing 28, or housing 28 may rotate about stationary shaft 12. Housing 28 may be part of the frame or stator of a stationary device such as a motor or pump which has a bearing (not shown) for centering the shaft. The seal module is sealed within the recess 29, preferably by static elastomeric seals or "O-rings" 25 and 27 located on the outer edges of the two pole pieces 14 and 16, respectively. O-rings 25 and 27 engage the inner wall of the recess 29 in an air-tight manner. Pole pieces 14 and 16 are preferably arranged, when the seal 11 is placed about shaft 12, such that a small clearance or gap (22 and 24 respectively) exists (typically within the range of 0.001 to 0.004 inches) radially between the inner edge of the pole pieces and the outer surface of the shaft. When the seal module is positioned within recess 29 of the housing and affixed thereto, the seal is, ideally, automatically centered about the shaft and is supported by the housing. The shaft may be rotationally driven by a motor or other means (not shown).

Shaft 12 and pole pieces 14 and 16 are composed of a magnetically-permeable material so that the magnetic field created by magnet 18 follows flux path F, as illustrated in FIG. 1. Flux path F extends across gaps 22 and 24 between the inner edges of pole pieces 14 and 16 and shaft 12, and retains ferrofluid 20 in gaps 22 and 24, thereby forming a liquid O-ring seal around shaft 12.

As aforementioned, it is critical to the operation of the ferrofluidic seal for pole pieces 14 and 16 to be relatively accurately centered about shaft 12 so that gaps 22 and 24 are radially relatively uniform. The centering ring of the present invention provides for self-centering of the seal when installing a seal about a shaft in applications where either the device does not have the hardware arranged to accommodate and automatically center the seal (as in the prior art embodiment of FIG. 1), or the shaft must be retrofitted with the seal because an end of the shaft is not accessible.

Figure 2A:
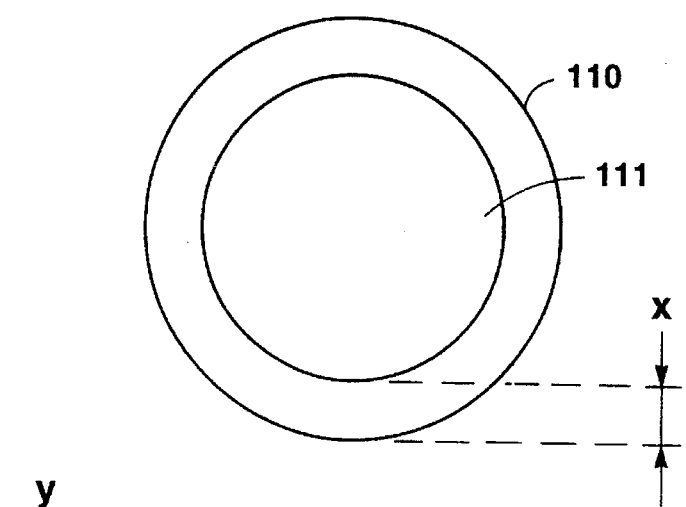
FIG. 2 is a side view of an inner edge of a pole piece mounted concentrically and non-concentrically with a shaft.
Figure 2B:
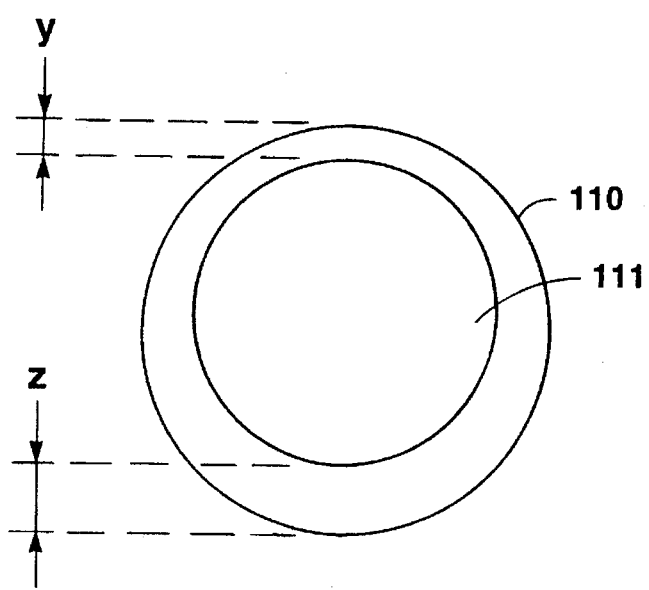

Referring now to FIG. 2(a), a side view of an inner surface 110 of a pole piece accurately centered about a shaft 111 is illustrated. X represents the clearance between shaft 111 and the inner surface 110 of the pole piece, that is, the width of the annular gap in which ferrofluid is retained to create a ferrofluidic seal (not drawn to scale). FIG. 2(b) illustrates the inner surface of a pole piece 110 which is non-concentrically mounted about shaft 111. Y represents the narrowest portion of the annular gap and Z, the widest portion. When this non-centered arrangement exists, magnetic flux is concentrated at Y to a greater degree than at Z. This may result in uneven distribution of ferrofluid within the annular gap, with more ferrofluid drawn to the gap at Y and less remaining in the gap at Z, especially when the shaft and pole piece(s) are in stationary relation with one another. Thus, the resultant ferrofluidic seal may be of insufficient pressure capacity at Z. Generally, if Y is greater than ½ X, that is, if the annular gap is wider at its narrowest point then one-half the width of the gap when the shaft is perfectly centered within the pole piece (within 50% uniformity), the resultant ferrofluidic seal will perform adequately. If Y is less than or equal to ½ X, problems may result.

Figure 2C:
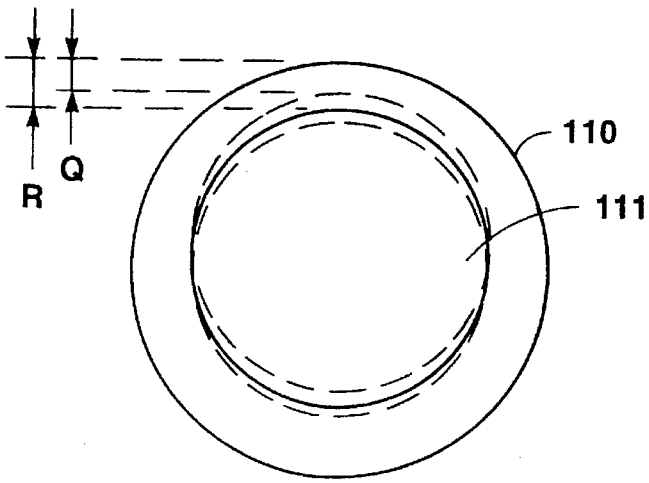

When the shaft is rotating relative to the pole piece, especially at high speed and/or in a situation in which significant shaft overhang exists, the situation may be complicated by vibration inherent in any rotating shaft. FIG. 2(c) illustrates pole piece 110 mounted slightly non-concentrically about shaft 111 when the shaft is stationary (solid line) and when the shaft vibrates during rotation (dotted line). Note that vibration of the shaft in one direction perpendicular to the longitudinal axis of the shaft only is shown for purposes of illustration. When shaft 111 is stationary, annular gap R at its narrowest portion may be wide enough for adequate sealing. However, when shaft 111 rotates (and vibrates), the gap may be narrow enough at its narrowest portion (Q) to create an unstable seal.

Figure 3:
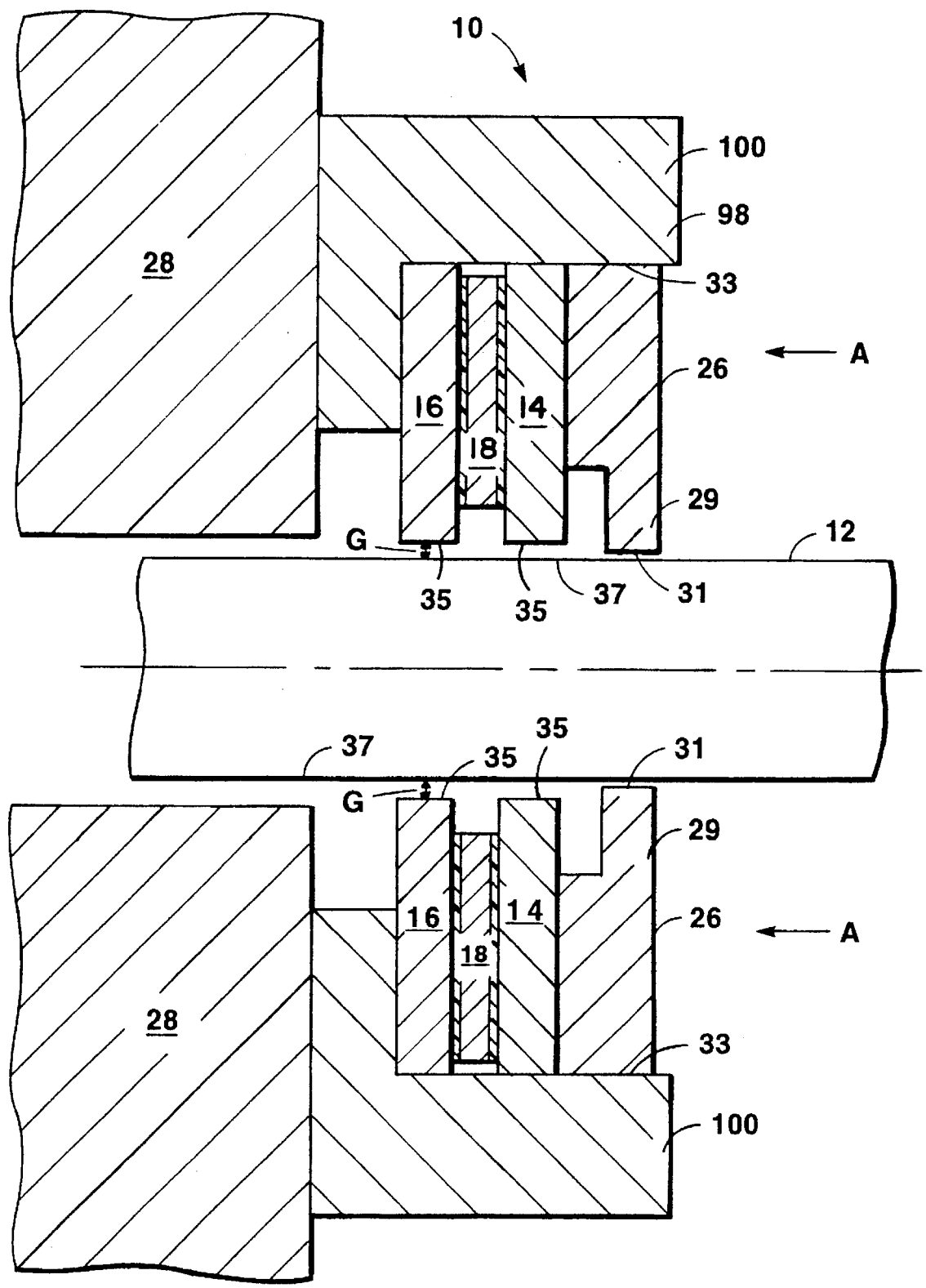
FIG. 3 is a cross-sectional view of a ferrofluidic seal illustrating the centering ring according to one embodiment of the present invention.

Referring now to FIG. 3, ferrofluidic seal module 10 is illustrated including annular magnet 18, annular pole pieces 14 and 16, and housing 100. Attached to the module 10 and/or housing 100 is centering ring 26 of the present invention which centering ring provides for the centering of the seal about the shaft. Ring 26 is an annular ring having an outer edge 33 which fits tightly within housing 100 and an inner portion 29 with an inner edge 31 which engages the shaft when installing the seal module 10 about the shaft. For purposes of illustration, centering ring 26 abuts both housing 100 and pole piece 14. It is to be understood, however, that centering ring 26 may be affixed to housing 100 alone, affixed to pole piece 14 alone, or affixed to both housing 100 and pole piece 14 as shown. When edge 31 engages shaft 12, the seal is positioned such that a desired gap G is formed between the inner edges 35 of pole pieces 14 and 16 and the outer surface 37 of the shaft. It is to be understood in this and subsequent embodiments that it may be desirable to create gap G between the shaft and: one pole piece only, more than one pole piece, one or more ridges in a multi-stage pole piece, the annular magnet, or any combination of the above. It is also to be understood in this and subsequent embodiments that the centering ring, as illustrated in FIG. 3, need not engage the shaft at inner edge 31 through an entire ring. That is, ring 26 may comprise a series of discrete inner portions 29 which extend inwardly to engage the shaft with sufficient circumferential frequency to perform the centering function. Once centered, housing 100 can be mounted to the housing 28 of another apparatus. Annular centering ring 26 is a precision component, which is machinable to precision tolerances, such that any desired gap G, including those within a few one thousandths of an inch can be achieved. Various embodiments of the centering ring 26 are herein envisioned, as will be described below.

One embodiment of the centering ring, such as that illustrated in FIG. 3, is intended to be removed from the seal after the centering function is performed and the housing 100 is affixed to a housing 28 of another device. Illustratively, such a centering ring would be fairly rigid and might be composed of aluminum, brass, steel or other fairly rigid non-magnetically permeable materials. The centering ring 26 can be removably fixed to the seal module 10 and/or seal housing 100 by means of a snap, a groove fitting, or other non-permanent means discussed below. Centering ring 26 of FIG. 3 has an L-shaped cross-section, such that it is rigid and sturdy within the housing yet its length and inner edge of the inner portion 29 are precisely defined. It is to be appreciated, however, that centering ring 26 may have another cross-sectional shape and still perform in accordance with the invention.

Figure 4:
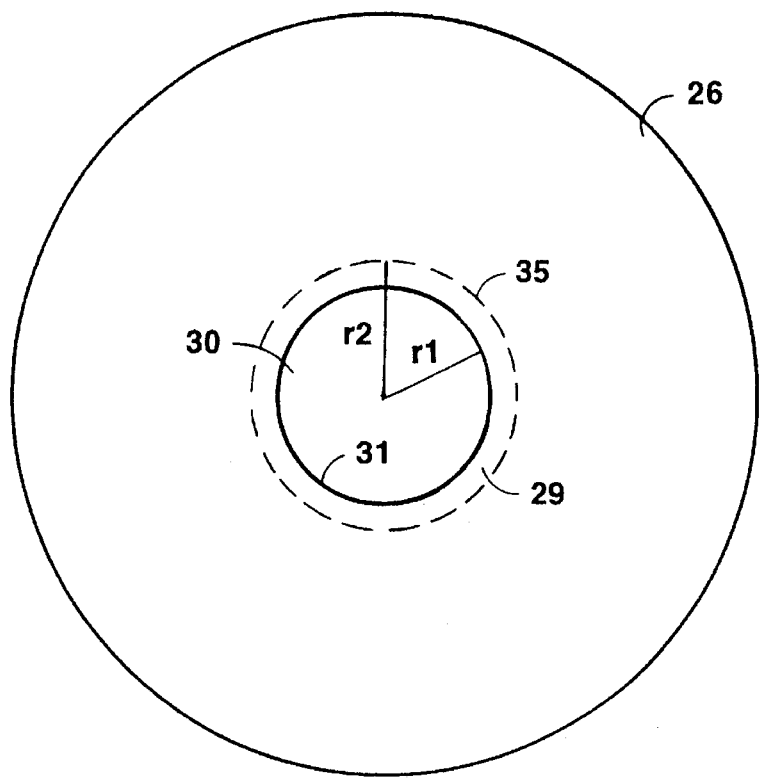
FIG. 4 is a side view of a centering ring according to one embodiment of the present invention viewed in the direction of arrows A of FIG. 3.

Referring to FIG. 4, a side view of centering ring 26 is illustrated as viewed in the direction A of FIG. 3. This embodiment is suitable for those applications where the seal can be slid over an end of the shaft (i.e., where an end of the shaft is accessible). As illustrated, centering ring 26 includes an inner hole 30 through which shaft 12 may run. Inner edge 31 of the centering ring defines a circle of radius r1. Shown in the dotted line in FIG. 4 is a circle defined by the inner edges 35 of pole pieces 14 and 16. The circle 35 has a radius r2. These circles 35 and 31 are concentric and radius r2 is greater than radius r1. Therefore, a gap G, approximately equal to the difference between r2 and r1, is generated. In addition, circles 35 and 31 are concentric with a circle (not shown) defined by a cross-section of the outer surface 37 of the shaft.

Figure 5:
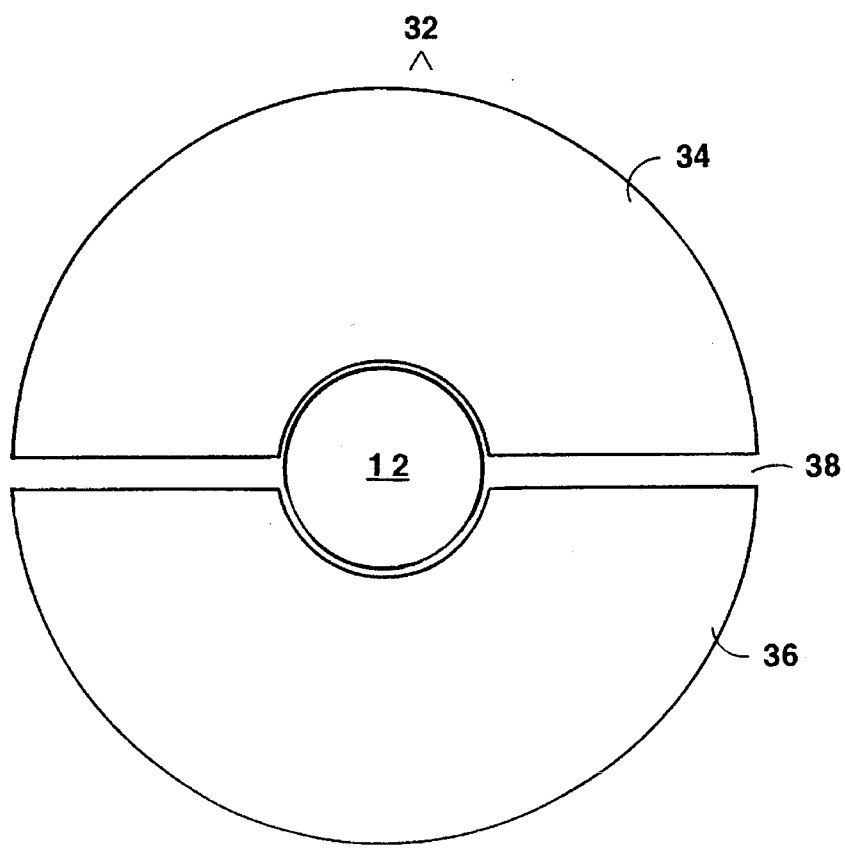
FIG. 5 is a side view of a centering ring according to an alternate embodiment of the present invention viewed in the direction of arrows A of FIG. 3.

Referring now to FIG. 5, a side view of an alternate embodiment centering ring 32 is illustrated, as viewed in direction A of FIG. 3. In this embodiment, centering ring 32 is a split centering ring having two substantially equal pieces 34 and 36 and may have a small gap 38 therebetween. Being split into two halves along a diameter, centering ring 32 can easily be removed after its centering function is performed. This, obviously, removes contact between the inner periphery of the centering ring material and the outer periphery of the shaft after installation of the seal. This split ring alternate embodiment configuration is useful when a solid centering ring, as illustrated for example in FIG. 4, cannot be removed from around a shaft because only a small amount of space is available. Note that, according to this embodiment, the two pieces 34 and 36 would simply clamp together over the shaft in a clam-shell arrangement. It is to be appreciated that the number of pieces into which the ring is divided to facilitate removal can be varied to suit the application, that the pieces do not need to contact one another, and that the pieces may be placed approximately symmetrically about the inner surface of the seal or in any manner that will facilitate accurate centering.

Figure 6:
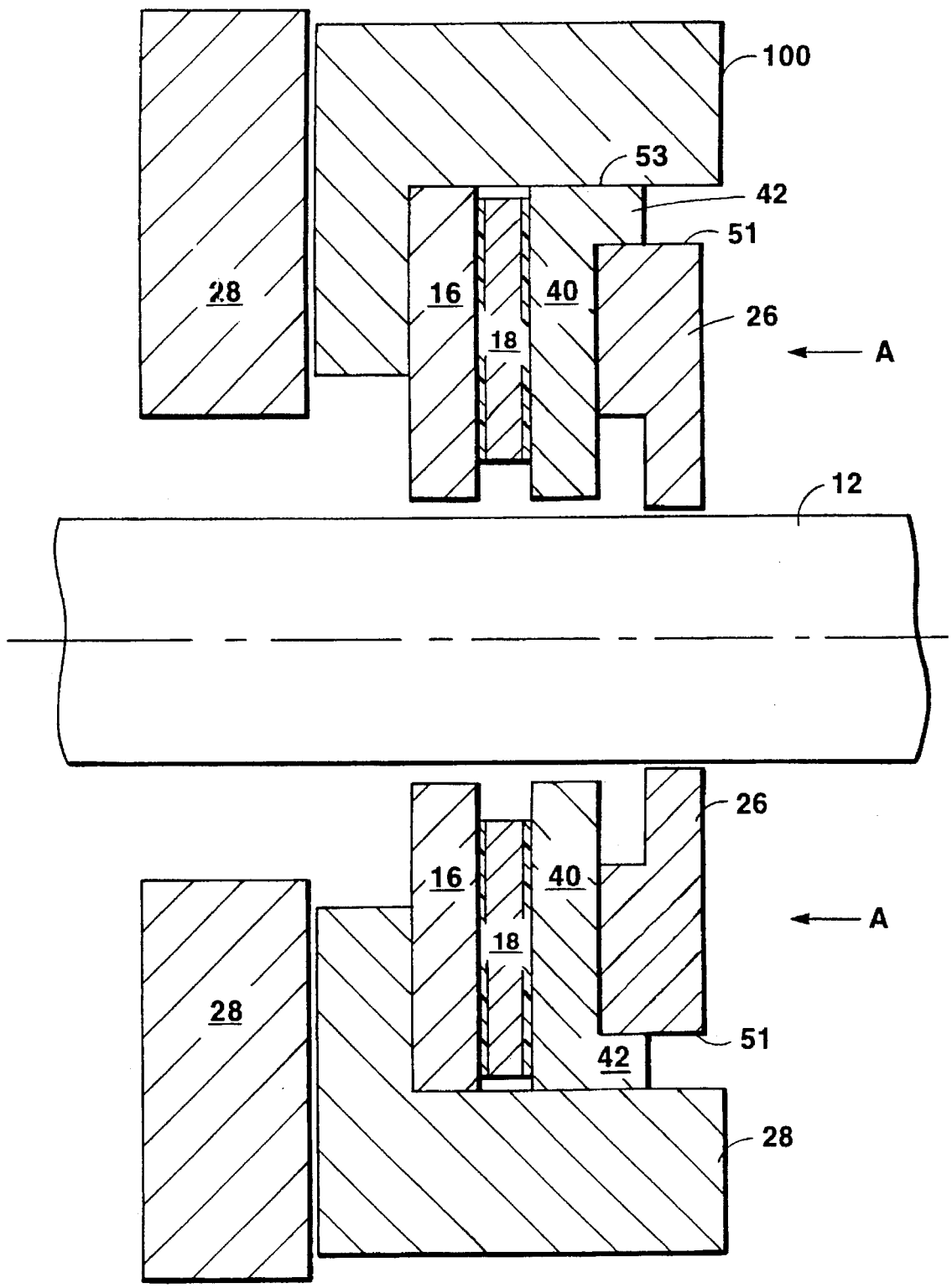
FIG. 6 is a cross-sectional view of a ferrofluidic seal according to another alternate embodiment of the present invention.

The centering ring may be affixed to the seal module and/or housing by a suitably prepared feature of the seal module 10 and/or seal housing 100 itself. For example, as illustrated in FIG. 3, the housing may be provided with a shoulder such that the centering ring fits within this shoulder and is held in place thereby. As illustrated, outer edge 33 of the centering ring fits tightly against shoulder 98 of housing 100. Alternatively, as FIG. 6 illustrates, one of the pole pieces may be provided with a similar shoulder within which the centering ring fits. As illustrated, the outer edge 51 of centering ring 26 fits tightly against shoulder 42 of pole piece 40.

Where elements of the seal module and centering ring have interfacing surfaces, those elements are machined to precision tolerances to yield a desired uniform gap G. Due to inherent inaccuracies in the machining process, however, complete uniformity of the gap is not attainable. As noted above with respect to FIG. 2, at least 50% uniformity is the target and is achievable with the centering ring of the present invention. The uniformity of the gap increases as the number of interfacing surfaces decreases. Thus, one advantage of the embodiment illustrated in FIG. 3 is that the pole pieces and centering ring are all centered precisely relative to each other due to their common piloting on housing 100 (assuming that surface 33 of housing 100 is precisely machined). In this embodiment, housing 100 must be concentric about shaft 12; any lack of concentricity in housing 100 will be transferred to the pole pieces and centering ring. An advantage of the embodiment illustrated in FIG. 6 is that, as centering ring 26 pilots directly on pole piece 40 (only one interface exists), pole piece 40 is better assured of concentricity with shaft 12. The concentricity of pole piece 16 is dependent upon its alignment with pole piece 40 according to this embodiment. But where a single-stage seal is desired, that is, where pole piece 40 retains ferrofluid and pole piece 16 acts as a magnetic flux enhancer (and is generally not mounted as close to the shaft as is pole piece 40), this embodiment may be most advantageous.

Figure 7:
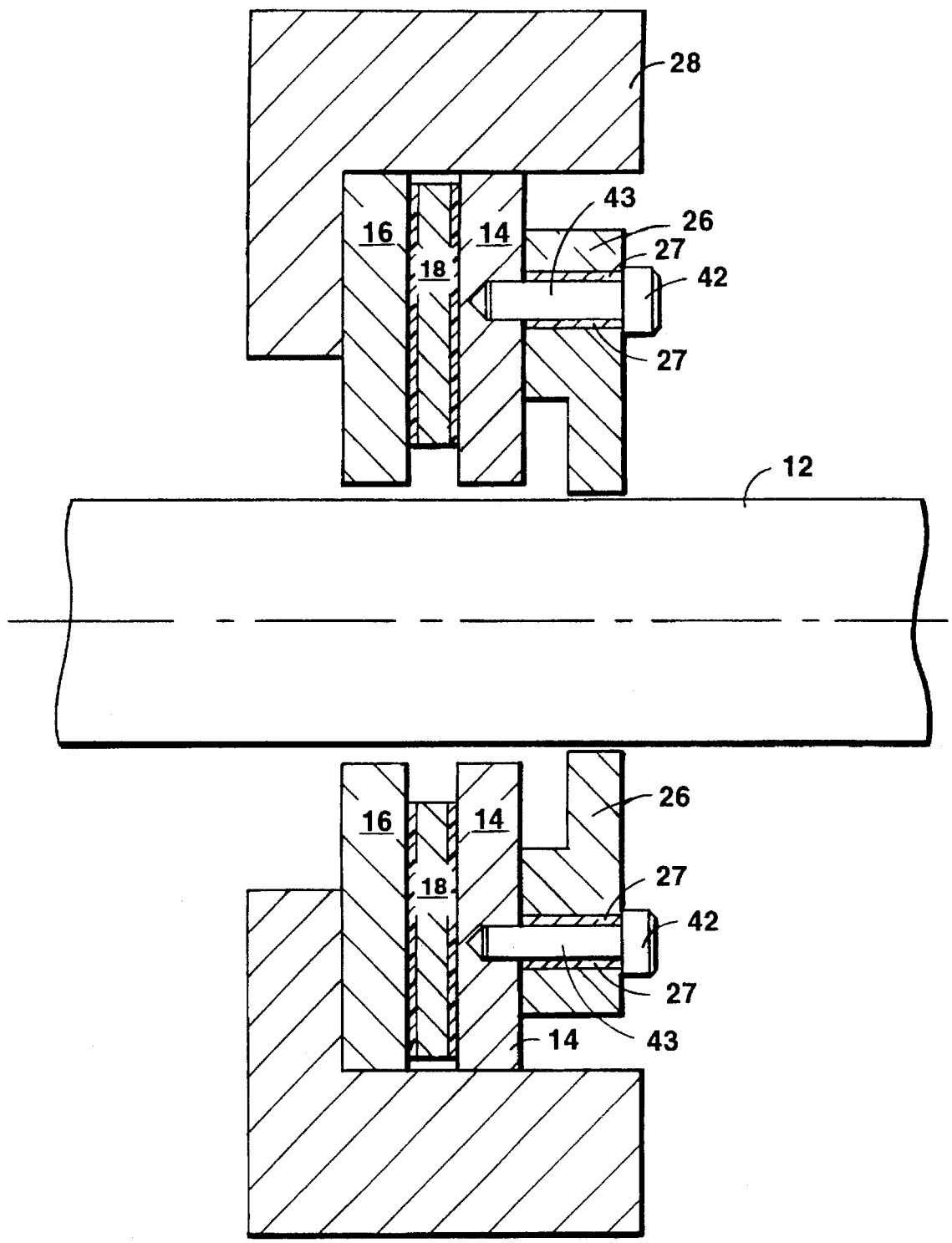
FIG. 7 is a cross-sectional view of a ferrofluidic seal according to a further alternate embodiment of the present invention.

FIG. 7 illustrates an alternative means for affixing the centering ring to the pole piece 14. As shown, centering ring 26 is affixed to the module by threaded fastener 42. Threaded fastener 42 is threaded through slot 27 of centering ring 26 and into pole piece 14. Slot 27 may be wider than body 43 of threaded fastener 42 (as is illustrated in FIG. 7) so that the position of centering ring 26 relative to the seal module may be adjusted. Adjusting the position of the centering ring can compensate for any positional defects or inaccuracies of the seal module elements.

Figure 8:
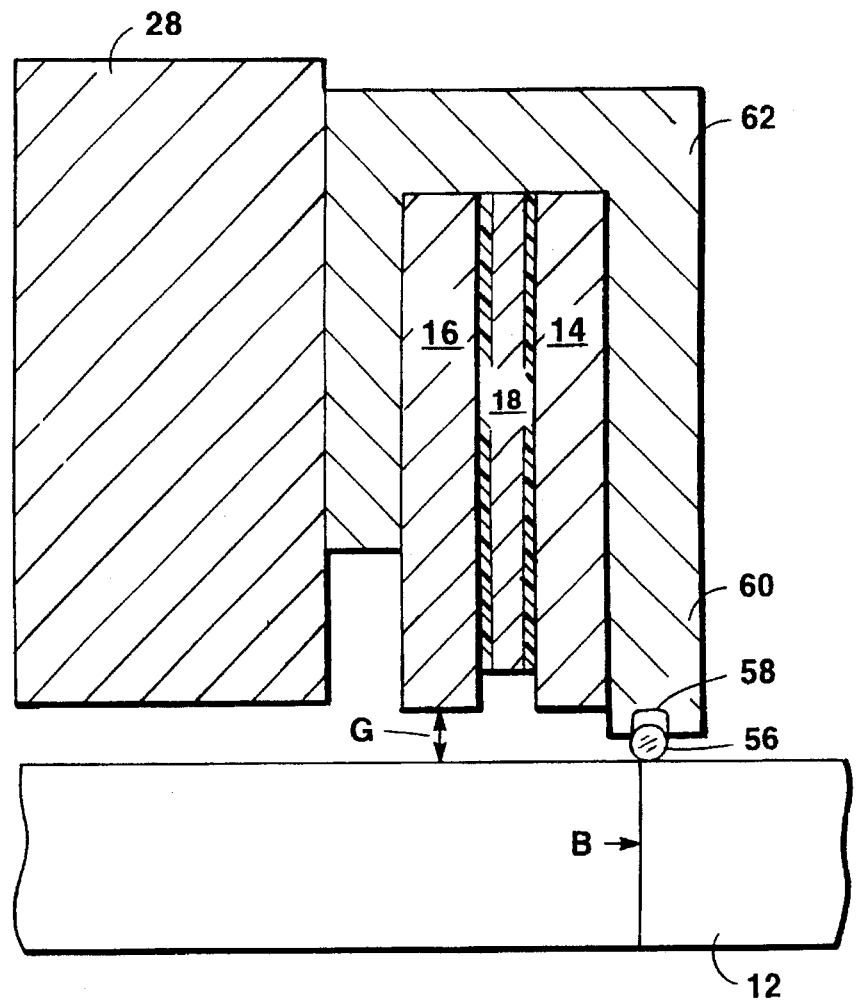
FIG. 8 is a cross-sectional view of a ferrofluidic seal, illustrating only the top half thereof, according to another alternate embodiment of the present invention.

FIGS. 8–11 illustrate alternate embodiments of the present invention in which the centering ring is affixed to the seal module by suitably designed interconnecting features of the seal housing and centering ring itself. In the embodiment of FIG. 8, a cord-like centering ring 56 is disposed within a recess 58 of an inwardly-extending portion 60 of housing 62. Recess 58 receives and retains centering ring 56 which, after the centering function is performed, is removed from the seal module.

Figure 9:
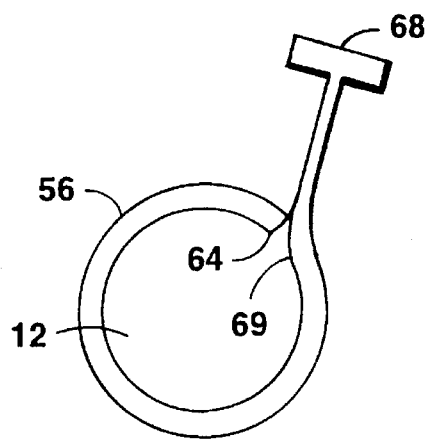
FIG. 9 is a side view of a centering ring of the alternate embodiment of FIG. 8.

FIG. 9 is a side view of the centering ring 56 of FIG. 8. As shown, centering ring 56 has a cord-like shape and when the seal is installed around the shaft, the cord-like centering ring 56 is wrapped around shaft 12. Centering ring 56 has a handle 68 at one end thereof which is disposed outside of the seal module (not shown). The opposite end 64 abuts against the centering ring at a point 69 such that the centering ring completely surrounds shaft 12 (although centering may be adequately achieved if ring 56 does not completely surround shaft 12, that is, if end 64 does not abut the ring at point 69). This "rip cord" arrangement of the centering ring allows the centering ring to be easily removed from the seal module after the centering function is performed, by pulling on handle 68.

Figure 10:
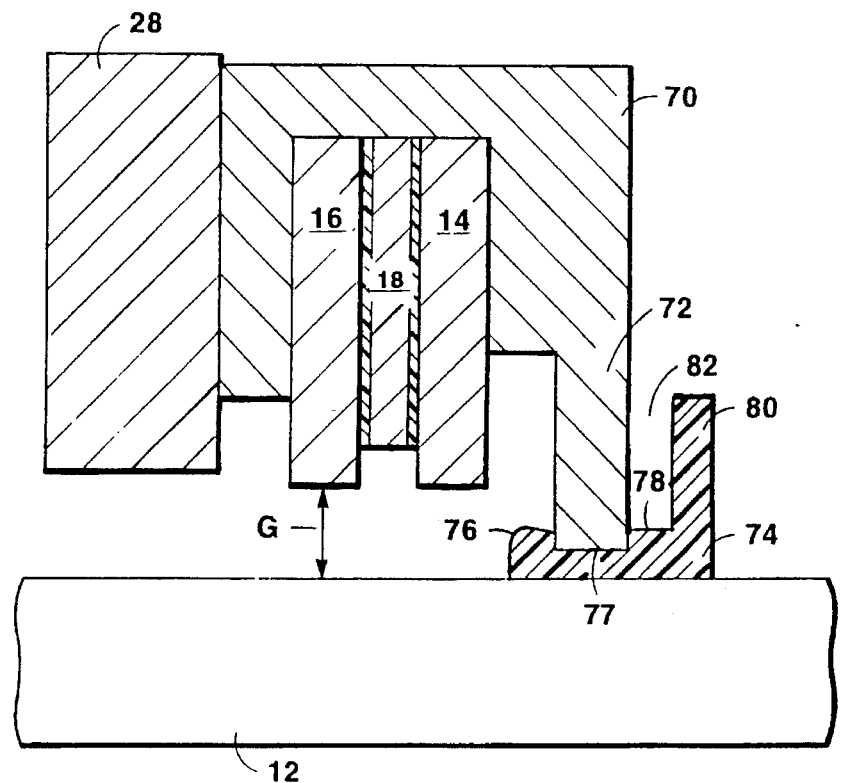
FIG. 10 is a cross-sectional view of a ferrofluidic seal, illustrating only the top half thereof, according to a further alternate embodiment of the present invention.

In the embodiment illustrated in FIG. 10, centering ring 74 includes two lips 76 and 78 which define a recess 77. Recess 77 receives and retains inwardly-extending portion 72 of housing 70. The centering ring is thereby affixed to the seal module. Space 82 is provided between inwardly-extending portion 72 of housing 70 and an outwardly-depending portion 80 of centering ring 74. The space is provided to allow for one to wedge a tool therein, such as a screwdriver tip (not shown), and to dislodge the centering ring from its retained position with the tool, after the centering function is performed. It is to be understood that centering ring 74 need not have a cross-section identical to that illustrated in FIG. 10 at all portions thereof. For example, lips 76 and 78 need not exist at all portions of the centering ring but need exist only with sufficient frequency around the ring for ring 74 to be affixed to the seal module for the centering purpose. Indeed, it may be advantageous for lip 76 to exist only at selected portions of ring 74 such that removal of the centering ring after use is not unacceptably difficult. Similarly, portion 80 of ring 74 need not exist throughout the ring but may advantageously exist with frequency such that ring removal is easily facilitated.

Figure 11:
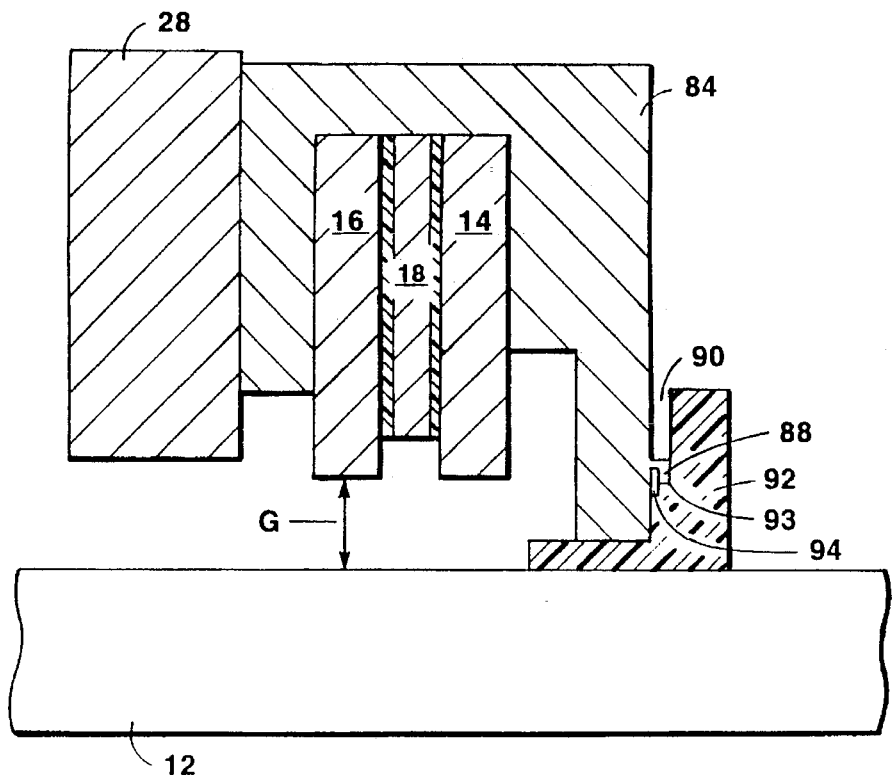
FIG. 11 is a cross-sectional view of a ferrofluidic seal, illustrating only the top half thereof, according to an even further alternate embodiment of the present invention.

FIG. 11 illustrates an embodiment in which an inwardly-extending portion 86 of housing 84 is provided with a lip 88 which is received within a recess 93 and abuts against lip 94 of centering ring 92. Centering ring 92 is thereby affixed to the seal module. After centering is performed, centering ring 92 can be removed from the seal module by inserting a tool within space 90 and dislodging the centering ring (as described above). Lip 88 of housing 84 may be designed to break off and remain with the centering ring during the dislodging of the centering ring. As noted above with respect to FIG. 10, the cross-section of centering ring 92 need not be as illustrated in FIG. 11 throughout the entire ring. For example, a series of separate tabs of cross-section similar to that illustrated for 92 in FIG. 11 may be positioned in series around the shaft and attached to portion 86 at discrete points, thus taking the place of one integral centering ring. Other embodiments may also be envisioned for the attachment of ring 92 to portion 86. For example, rather than the recess 93 and lip 94 illustrated in FIG. 11, a protrusion from ring 92 or a separate portion thereof may "snap" into a recess at various locations along inwardly-extending portion 86, along with equivalent embodiments.

The centering ring configurations described above are designed to be removed after the ferrofluid seal is centered and mounted. If left in place, such a centering ring would rub against the rotating shaft potentially causing drag, heat and possible shaft damage. In accordance with another embodiment of the invention, a non-removable centering ring would function identically to the centering rings described above, while offering the additional advantage that it would not need to be removed during operation. Non-removable centering rings could be made from a suitable material such that the action of the rotating shaft would cause the inner edge of the centering ring to either be quickly abraded or broken away. In this way, harmful shaft contact would be eliminated after the centering feature is accomplished.

Figure 12:
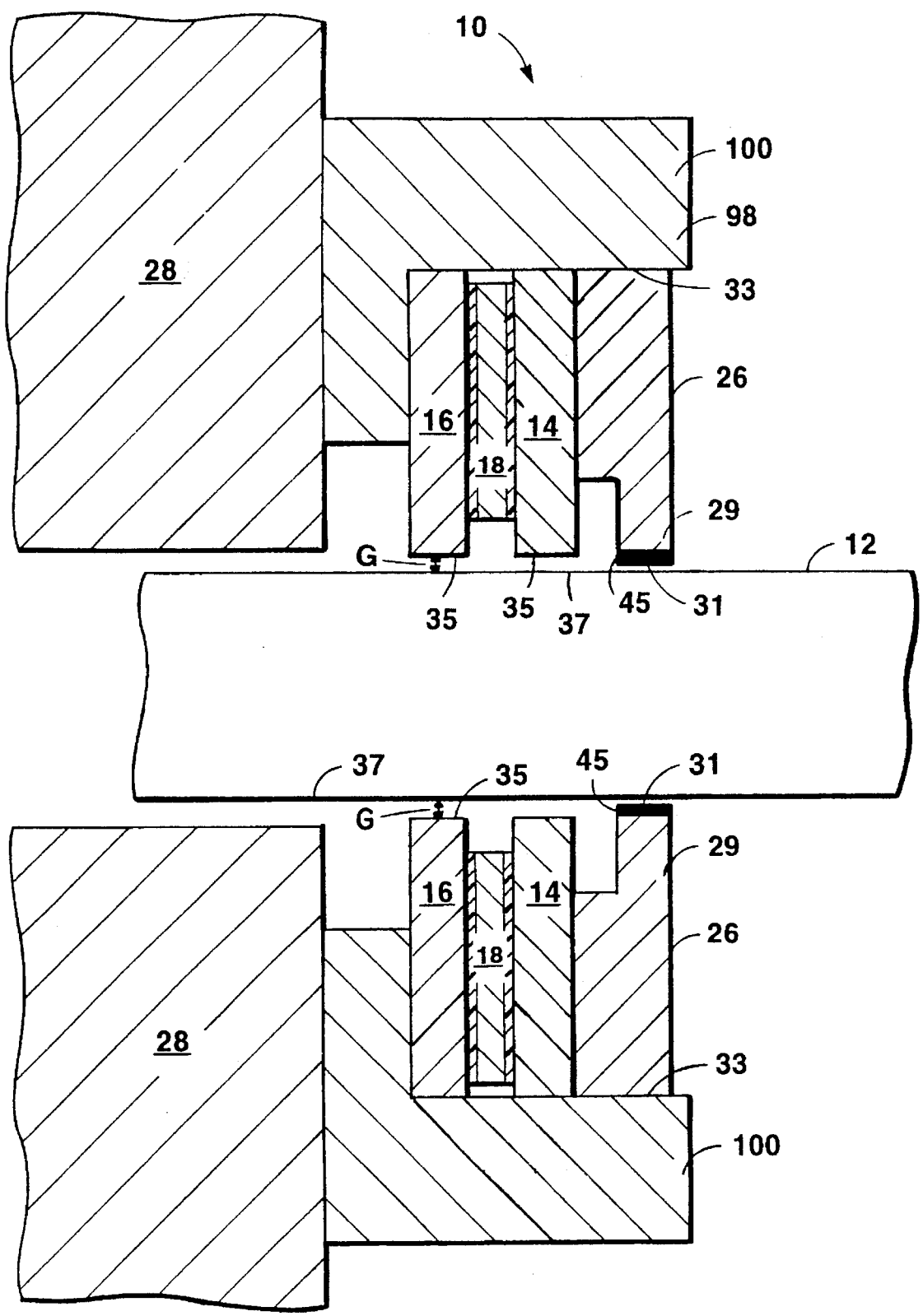
FIG. 12 is a cross-sectional view of a ferrofluidic seal illustrating a centering ring having an abradable inner edge according to one embodiment of the present invention.

A non-removable centering ring is illustrated in FIG. 12. Centering ring 26 is made from, or has its inner edge 31 coated with, an abradable material 45. Alternatively, inner edge 31 may also be a separate part made from an abradable material, which is attached to the centering ring or housing. This material 45 has a relatively high stiffness to provide accurate centering, but low hardness as compared with the shaft material to avoid shaft damage, and a predictable wear rate such that it abrades uniformly. Many such materials have been developed for similar wear applications such as mechanical seals, bushings, brake pads, and chain guides. Examples of suitable materials for such use include carbon filled teflons (CFT), polyimide, polyacetal, polybenzimidazole (PBI), poly-ether-ether-ketone (PEEK), and ultra high molecular weight polyethylene (UHMWPE). These and other "engineered plastics" can be used in a pure state or compounded with fillers and/or reinforcement materials such as glass, talc, graphite and molybdenum disulfide to tailor their mechanical and wear properties to suit a particular application.

Figure 13:
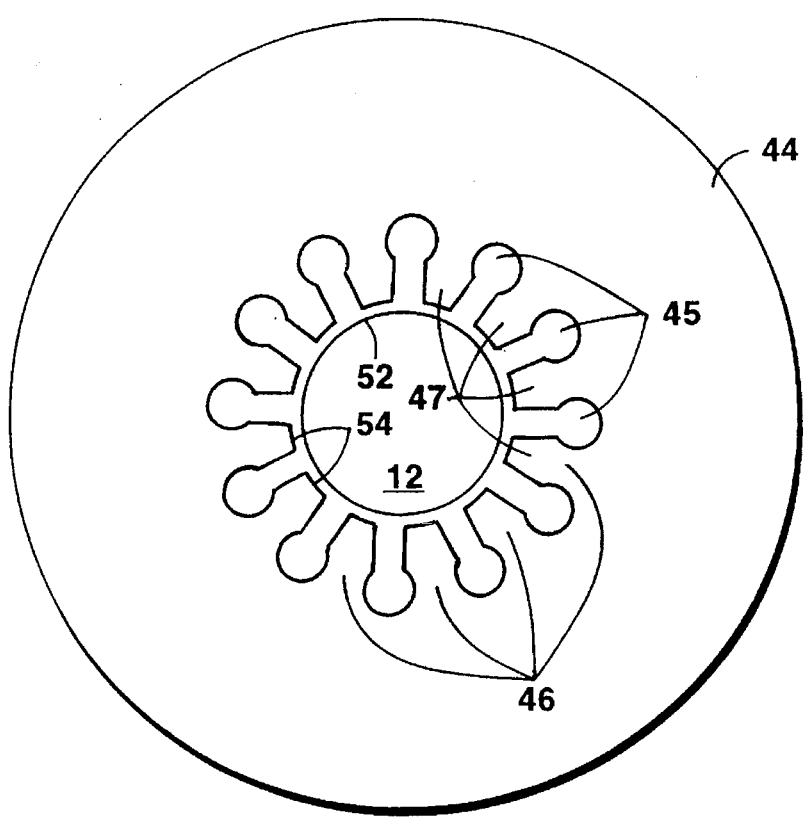
FIG. 13 is a side view of a centering ring according to a further alternate embodiment of the present invention as viewed in the direction of arrow A of FIG. 3.

As an alternative to fabricating the centering ring from, or coating the inner edge with, an abradable material, the centering ring could be designed with an inner edge that will break away when in contact with a rapidly rotating shaft. Such a centering ring is illustrated in FIG. 13. As shown, centering ring 44 has an inner periphery 52 provided with a plurality of radial cuts 45. Cuts 45 define a plurality of fingers 46, each finger having an inner edge 54 at inner periphery 52 for engagement with the rotating shaft. The resulting discontinuous inner periphery 52 of the centering ring 44 is still sufficient to provide the centering function. Radial fingers 46, after performing the centering function, may break off when contacted by a rotating shaft. In particular, the fingers can be designed and molded so as to form stress points at predetermined locations, which points cause the fingers to break away in a predictable way and fall off in a predictable direction (so as to not come into contact with any machine parts or people's eyes).

Such a non-removable centering ring may serve an additional function in certain applications which involve pressurization of the ferrofluid seal. In particular, when a ferrofluidic seal undergoes overpressurization, intermittent or otherwise, some of the ferrofluid trapped in the seal gaps may be displaced out of the gaps. That is, the seals may "burst" as described above. Such loss of ferrofluid commonly results in a seal having a diminished pressure capacity. After undergoing a number of overpressurization cycles, the seal may lose its entire capacity to perform as a seal due to the loss of a substantial amount of ferrofluid. However, if the ferrofluid displaced from the seal gaps during overpressurization is maintained at a close proximity to the seal gaps, it may be drawn back into the seal by the force of the magnetic attraction. Therefore, a means of physically holding or of maintaining displaced ferrofluid close to seal gaps during overpressurization may increase the seal's capacity to recover after each overpressurization, thereby allowing the seal to undergo repeated overpressurization procedures without failure. A non-removable centering ring of the abradable type may serve as the most effective means of retaining ferrofluid by acting as a physical barrier for maintaining displaced ferrofluid in close proximity to the seal gaps during pressurization.

Alternatively, a ferrofluid retention apparatus designed specifically to perform this retaining function may be employed comprising, for example, a block of material having an inner periphery in close proximity with the periphery of a shaft, and means for mounting the retaining apparatus in a proximal relation to the pole piece such that ferrofluid, expelled from the seal during bursting, is retained at a location in proximity to the pole piece such that the expelled ferrofluid is drawn back into the active portion of the seal by the magnetic field.

The centering ring of the present invention is very useful in performing the centering function. It allows for producing a small, substantially circumferentially uniform gap between an inner surface of a pole piece, pole pieces, magnet or magnets, or other components of a ferrofluid seal apparatus, and an outer surface of a shaft.

A ferrofluidic seal having a centering ring of the present invention is especially useful in cases where the seal is required to be installed into pre-existing equipment. These cases are particularly common when a ferrofluidic seal is being added to a device that was not originally designed for such a ferrofluidic seal. An example of this includes a centrifugal pump which was not originally designed for such a seal but may thereafter be retrofitted with a ferrofluidic seal to eliminate leakage. Another common scenario occurs when a ferrofluidic seal is installed to replace an existing seal (to improve hermeticity), or installed in series with another seal which is subject to slight leakage. An example of the latter double seal case includes a robotic actuator designed for use in ultra-pure vacuum processing of semiconductor wafers. With such pre-existing equipment, a ferrofluidic seal, which includes a centering ring of the present invention, may be fitted onto a rotating shaft and be automatically centered. The centering ring of the present invention additionally offers ease of installation.

It is to be understood that the centering mechanisms of the present invention may be utilized in a variety of applications in which a member such as a shaft must be centered within another member such as a housing. That is, the centering mechanism of the present invention is not limited to use with ferrofluidic seals.

Those skilled in the art will readily appreciate that all parameters listed herein are meant to be exemplary and actual parameters will depend on the specific application for which the seal is being used. It is, therefore, to be understood that the foregoing embodiments are presented by way of example only and that, within the scope of the appended claims and equivalents thereto, the invention may be practiced otherwise than as specifically described.

What is claimed is:

1. A ferrofluid seal apparatus for establishing a ferrofluid seal about a shaft having a periphery with a known diameter $d_s$, the apparatus comprising:

a ferrofluid seal comprising at least one magnet creating a magnetic field and at least one pole piece axially disposed about the shaft, the pole piece extending toward the shaft to form a seal gap between the pole piece and the shaft which gap is fillable with ferrofluid;

a centering ring the position of which may be fixed in a predetermined position relative to the pole piece and which has an inner periphery the diameter of which is substantially $d_s$, the inner periphery being precisely located on the centering ring such that, when the centering ring is in the predetermined position relative to the pole piece, the inner periphery is precisely located relative to the pole piece and the inner periphery contacts the periphery of the shaft, locating the pole piece relative to the shaft so as to force the seal gap to become substantially uniform around the shaft.

2. A seal apparatus as claimed in claim 1 further comprising means for removing contact between the inner periphery of the centering ring and the periphery of the shaft.

3. A seal apparatus as claimed in claim 1 wherein the centering ring comprises a non-magnetically permeable material.

4. A seal apparatus as claimed in claim 1 wherein the ferrofluid seal includes a housing in which the pole piece is mounted, the housing comprising a recess which receives the centering ring.

5. A seal apparatus according to claim 1 wherein the inner periphery is composed of an abradable material.

6. A seal apparatus according to claim 1 wherein the inner periphery defines a plurality of fingers, the fingers being shaped and located in the inner periphery such that the fingers break off when in contact with the shaft.

7. A seal apparatus according to claim 1 wherein the centering ring is cord-shaped and further comprises a handle attached to the centering ring which, when pulled, removes the centering ring.

8. A seal apparatus according to claim 1 wherein the seal is subject to bursting due to overpressurization, and wherein the inner periphery of the centering ring is constructed and arranged to retain within the magnetic field a majority of ferrofluid displaced from the seal during bursting so as to draw the ferrofluid back into the seal.

9. A seal apparatus according to claim 1 further comprising securing means which fixes the centering ring in said predetermined position relative to the pole piece.

10. A seal apparatus according to claim 9 wherein said securing means comprises a bolt.

11. A seal apparatus according to claim 9 wherein said securing means is a portion of the ring which is breakable under physical stress.

12. A seal apparatus according to claim 1 wherein the centering ring further comprises a tool insertion location in which a tool may be inserted, and against which force may be applied with the tool which results in dislodging of the ring from the pole piece.

13. A rotary coupling apparatus having a ferrofluid seal with at least one magnet creating a magnetic field and at least one pole piece, the apparatus comprising:

a shaft having a periphery, the shaft being located such that the pole piece is axially disposed around the shaft and extends toward the shaft to form a seal gap between the pole piece and the shaft, which seal gap is fillable with ferrofluid;

a centering ring the position of which may be fixed in a predetermined position relative to the pole piece, the centering ring having an inner periphery which is precisely located on the centering ring such that, when the centering ring is in the predetermined position relative to the pole piece, the inner periphery is precisely located relative to the pole piece and the inner periphery contacts the periphery of the shaft, locating the pole piece relative to the shaft so as to force the seal gap to become substantially uniform around the shaft.

14. An apparatus as claimed in claim 13 further comprising means for removing contact between the inner periphery of the centering ring and the periphery of the shaft.

15. An apparatus as claimed in claim 13 wherein the centering ring comprises a non-magnetically permeable material.

16. An apparatus as claimed in claim 13 wherein the ferrofluid seal includes a housing in which the pole piece is mounted, the housing comprising a recess which receives the centering ring.

17. An apparatus according to claim 13 wherein the inner periphery is composed of an abradable material.

18. An apparatus according to claim 13 wherein the inner periphery defines a plurality of fingers, the fingers being shaped and located in the inner periphery such that the fingers break off when in contact with the shaft.

19. A seal apparatus according to claim 13 wherein the centering ring is cord-shaped and further comprises a handle attached to the centering ring which, when pulled, removes the centering ring.

20. A seal apparatus according to claim 13 wherein the seal is subject to bursting due to overpressurization, and wherein the inner periphery of the centering ring is constructed and arranged to retain within the magnetic field a majority of ferrofluid displaced from the seal during bursting so as to draw the ferrofluid back into the seal.

21. A seal apparatus according to claim 13 further comprising securing means which fixes the centering ring in said predetermined position relative to the pole piece.

22. A seal apparatus according to claim 21 wherein said securing means comprises a bolt.

23. A seal apparatus according to claim 21 wherein said securing means is a portion of the ring which is breakable under physical stress.

24. A seal apparatus according to claim 13 wherein the centering ring further comprises a tool insertion location in which a tool may be inserted, and against which force may be applied with the tool which results in dislodging of the ring from the pole piece.

* * * * *